(12) United States Patent
Chen et al.

(10) Patent No.: US 12,174,790 B2
(45) Date of Patent: Dec. 24, 2024

(54) GENERATING PARAMETER VALUES FOR SNAPSHOT SCHEDULES UTILIZING A REINFORCEMENT LEARNING FRAMEWORK

(71) Applicant: Dell Products L.P., Round Rock, TX (US)

(72) Inventors: Chi Chen, Chengdu (CN); En Shi, Chengdu (CN); Changyue Dai, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/127,123

(22) Filed: Mar. 28, 2023

(65) Prior Publication Data
US 2024/0311337 A1    Sep. 19, 2024

(30) Foreign Application Priority Data

Mar. 13, 2023  (CN) .......................... 202310265727.1

(51) Int. Cl.
*G06F 16/00*    (2019.01)
*G06F 16/11*    (2019.01)
*G06N 20/00*    (2019.01)

(52) U.S. Cl.
CPC .......... *G06F 16/128* (2019.01); *G06N 20/00* (2019.01)

(58) Field of Classification Search
None
See application file for complete search history.

(56) References Cited

U.S. PATENT DOCUMENTS 8,762,304 B2 * 6/2014 Chitapur ............... G06F 9/4881
726/1
11,042,519 B2 * 6/2021 Dixit ..................... G06N 20/00
(Continued)

OTHER PUBLICATIONS

FIO, "Flexible I/O Tester," https://fio.readthedocs.io/en/latest/fio_doc.html, Accessed Mar. 28, 2023, 84 pages.
(Continued)

*Primary Examiner* — Debbie M Le
(74) *Attorney, Agent, or Firm* — Ryan, Mason & Lewis, LLP

(57) ABSTRACT

An apparatus comprises a processing device configured to detect a request for an updated snapshot schedule for an information technology asset, and to determine a current state of the information technology asset comprising a set of snapshot parameters of a current snapshot schedule and one or more performance metric values. The processing device is also configured to generate, utilizing a reinforcement learning framework, an updated parameter value for at least one of the snapshot parameters based at least in part on the current state. The processing device is further configured to monitor performance of the information technology asset utilizing the updated snapshot schedule comprising the updated parameter value for the at least one snapshot parameter, and to update the reinforcement learning framework based at least in part on a subsequent state of the information technology asset determined while monitoring performance of the information technology asset utilizing the updated snapshot schedule.

20 Claims, 13 Drawing Sheets

(56) References Cited

U.S. PATENT DOCUMENTS

| | | | |
|---|---|---|---|
| 11,507,597 B2* | 11/2022 | Jain | G06F 11/1469 |
| 11,604,701 B2* | 3/2023 | Vishwakarma | G06F 11/1458 |
| 11,625,416 B1* | 4/2023 | Grunwald | G06F 16/1844 |
| | | | 707/624 |
| 2017/0147985 A1* | 5/2017 | Sampath | G06Q 10/1093 |
| 2023/0342267 A1* | 10/2023 | Pabón | G06F 21/00 |
| 2024/0256568 A1* | 8/2024 | Schmoll | G06F 11/1458 |

OTHER PUBLICATIONS

"HammerDB," https://www.hammerdb.com/about.html, Accessed Mar. 28, 2023, 9 pages.

VMware, "Using VMware Cloud Disaster Recovery," Jan. 25, 2023, 290 pages.

VMware, "VMware® vSphere Virtual Volumes (vVols): Getting Started Guide," Mar. 2019, 40 pages.

Standard Performance Evaluation Corporation, "SPECjbb2015 Benchmark User Guide," May 25, 2017, 49 pages.

V. Mnih et al., "Playing Atari with Deep Reinforcement Learning," Neural Information Processing Systems, Jan. 1, 2013, 9 pages.

Y. Li et al., "Deep Reinforcement Learning," arXiv:1810.06339v1, Oct. 15, 2018, 150 pages.

* cited by examiner

| | PROCESSED REQUESTS | DATABASE TRANSACTIONS PER SECOND | FIO (SEQUENTIAL IO) | FIO (RANDOM IO) | FIO (LARGE SEQUENTIAL IO) |
|---|---|---|---|---|---|
| VMFS | NO IMPACT | 65% LOSS | 65% LOSS | 65% LOSS | 70% LOSS |
| vSAN | NO IMPACT | NO IMPACT | NO IMPACT | 35% LOSS | NO IMPACT |
| vVOL | NO IMPACT | NO IMPACT | NO IMPACT | NO IMPACT | NO IMPACT |

FIG. 4

```
<VM Info>
Guest OS = CentOS 7 (64-bit)
CPU = 4
Memory = 4 GB
Hard disk = 300GB
<Snapshot_Schedule >
Snapshot Taken Frequency :<1 hour>
Snapshot Retention: <7 days>
<Application_Type>
VMFS
<IO_pattern_Info>
average_IO size =8(KB)
Read/write ratio=95(Read percentage)
IO_type= Random
<Runtime Info>
average_total_IOPS=60(K)
average_throughput=250(MB/S)
average_CPU_Util=70 (percentage)
average_Latency=2(ms)
```

FIG. 6

| ACTION NUMBER | ACTION | CURRENT SNAPSHOT SCHEDULE | NEW SNAPSHOT SCHEDULE |
|---|---|---|---|
| 1 | MOVE 'SNAPSHOT TAKEN FREQUENCY' TO NEXT BIGGER VALUE | SNAPSHOT TAKEN FREQUENCY = 1 HOUR<br><br>SNAPSHOT RETENTION = 7 DAYS | SNAPSHOT TAKEN FREQUENCY = 2 HOURS<br><br>SNAPSHOT RETENTION = 7 DAYS |
| 2 | MOVE 'SNAPSHOT TAKEN FREQUENCY' TO NEXT SMALLER VALUE | SNAPSHOT TAKEN FREQUENCY = 1 HOUR<br><br>SNAPSHOT RETENTION = 7 DAYS | SNAPSHOT TAKEN FREQUENCY = 30 MINUTES<br><br>SNAPSHOT RETENTION = 7 DAYS |
| 3 | MOVE 'SNAPSHOT RETENTION' TO NEXT BIGGER VALUE | SNAPSHOT TAKEN FREQUENCY = 1 HOUR<br><br>SNAPSHOT RETENTION = 7 DAYS | SNAPSHOT TAKEN FREQUENCY = 1 HOUR<br><br>SNAPSHOT RETENTION = 8 DAYS |
| 4 | MOVE 'SNAPSHOT RETENTION' TO NEXT SMALLER VALUE | SNAPSHOT TAKEN FREQUENCY = 1 HOUR<br><br>SNAPSHOT RETENTION = 7 DAYS | SNAPSHOT TAKEN FREQUENCY = 1 HOUR<br><br>SNAPSHOT RETENTION = 6 DAYS |
| 5 | NO ACTION | SNAPSHOT TAKEN FREQUENCY = 1 HOUR<br><br>SNAPSHOT RETENTION = 7 DAYS | SNAPSHOT TAKEN FREQUENCY = 1 HOUR<br><br>SNAPSHOT RETENTION = 7 DAYS |

FIG. 7

GENERATING PARAMETER VALUES FOR SNAPSHOT SCHEDULES UTILIZING A REINFORCEMENT LEARNING FRAMEWORK

RELATED APPLICATION

The present application claims priority to Chinese Patent Application No. 202310265727.1, filed on Mar. 13, 2023 and entitled "Generating Parameter Values for Snapshot Schedules Utilizing a Reinforcement Learning Framework," which is incorporated by reference herein in its entirety.

FIELD

The field relates generally to information processing, and more particularly to management of information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for generating parameter values for snapshot schedules utilizing a reinforcement learning framework.

In one embodiment, an apparatus comprises at least one processing device comprising a processor coupled to a memory. The at least one processing device is configured to detect a request for an updated snapshot schedule for an information technology asset in an information technology infrastructure, and to determine a current state of the information technology asset, the current state of the information technology asset comprising a set of snapshot parameters of a current snapshot schedule for the information technology asset and one or more performance metric values for the information technology asset. The at least one processing device is also configured to generate, utilizing a reinforcement learning framework, at least one updated parameter value for at least one snapshot parameter of the set of snapshot parameters to be utilized in the updated snapshot schedule for the information technology asset based at least in part on the current state of the information technology asset. The at least one processing device is further configured to monitor performance of the information technology asset utilizing the updated snapshot schedule comprising the at least one updated parameter value for the at least one snapshot parameter of the set of snapshot parameters, and to update the reinforcement learning framework based at least in part on a subsequent state of the information technology asset determined while monitoring the performance of the information technology asset utilizing the updated snapshot schedule.

These and other illustrative embodiments include, without limitation, methods, apparatus, networks, systems and processor-readable storage media.

BRIEF DESCRIPTION OF THE DRAWINGS

FIG. 4 shows a table of snapshot performance information for virtual machines under different benchmark workloads in an illustrative embodiment.

FIG. 6 shows an example of virtual machine state information in an illustrative embodiment.

FIG. 7 shows a table of an action space for tuning snapshot policies in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
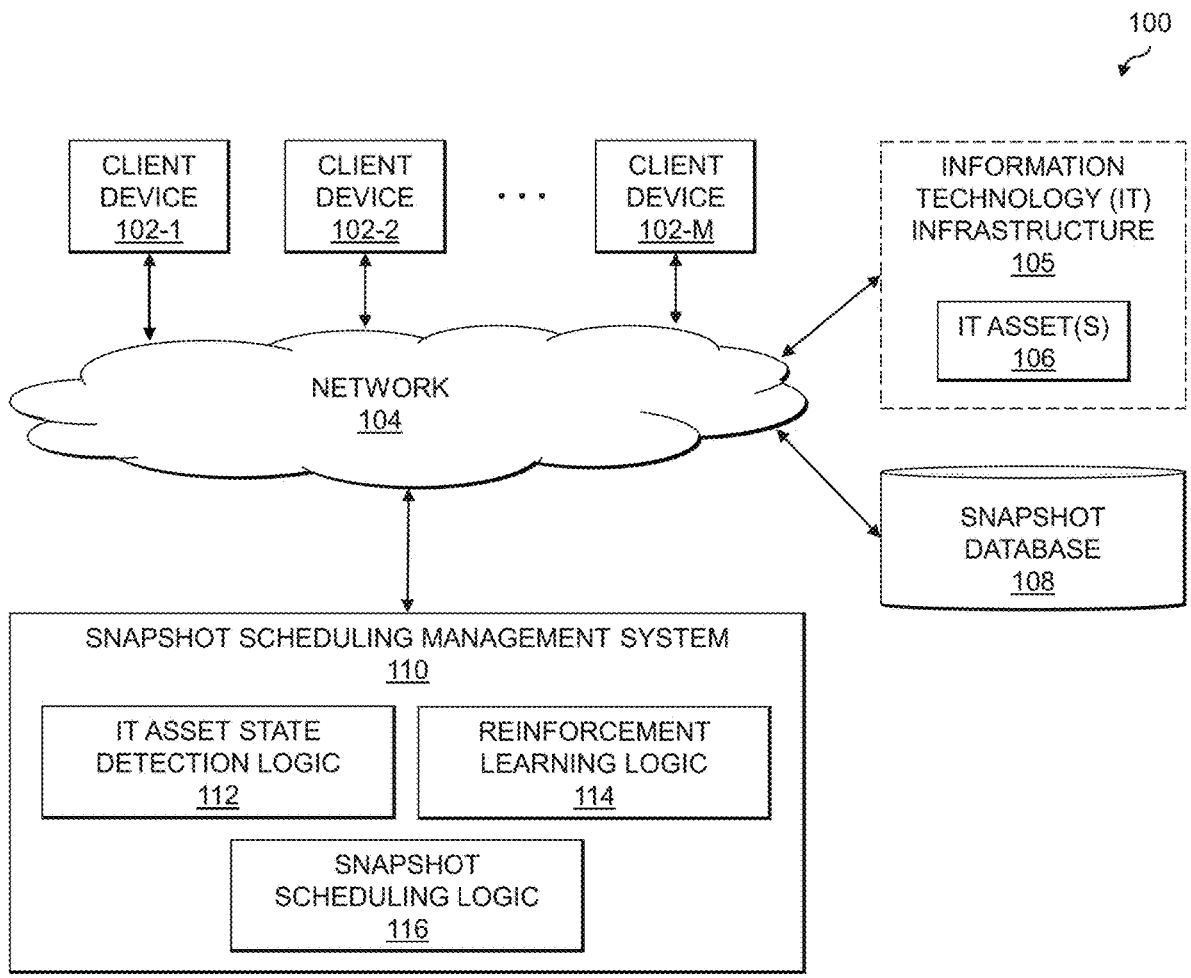
FIG. 1 is a block diagram of an information processing system configured for generating parameter values for snapshot schedules utilizing a reinforcement learning framework in an illustrative embodiment.

FIG. 1 shows an information processing system 100 configured in accordance with an illustrative embodiment. The information processing system 100 is assumed to be built on at least one processing platform and provides functionality for generating parameter values for snapshot schedules utilizing a reinforcement learning framework. The information processing system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a snapshot database 108, and a snapshot scheduling management system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102. It is assumed that the client devices 102 and/or IT assets 106 of the IT infrastructure 105 utilize one or more machine learning algorithms as part of such applications. As described in further detail below, the snapshot scheduling management system 110 can advantageously be used to determine an optimal or improved snapshot schedule for the client devices 102 and/or IT assets 106 which balances various factors, including but not limited to performance and data security factors.

In some embodiments, the snapshot scheduling management system 110 is used for an enterprise system. For example, an enterprise may subscribe to or otherwise utilize the snapshot scheduling management system 110 for controlling snapshot policies for its assets (e.g., IT assets 106 in the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The snapshot database 108 is configured to store and record snapshots and various information that is used by the snapshot scheduling management system 110 for setting and updating snapshot policies for different ones of the IT assets 106. Such information may include, for example, performance information characterizing performance of different types of IT assets 106 which are running different workloads, information utilized in a reinforcement learning algorithm used to control updates to snapshot policies (e.g., state information, an action space, reward information, etc.), etc. In some embodiments, one or more of the storage systems utilized to implement the snapshot database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the snapshot scheduling management system 110, as well as to support communication between the snapshot scheduling management system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes setting or otherwise controlling snapshot scheduling policies for the IT assets 106). For example, a given one of the client devices 102 may be operated by a user to access a graphical user interface (GUI) provided by the snapshot scheduling management system 110 to manage a snapshot schedule for one or more of the IT assets 106 of the IT infrastructure 105. The snapshot scheduling management system 110 may be provided as a cloud service that is accessible by the given client device 102 to allow the user thereof to manage snapshot schedules for one or more of the IT assets 106 of the IT infrastructure 105. In some embodiments, the IT assets 106 of the IT infrastructure 105 are owned or operated by the same enterprise that operates the snapshot scheduling management system 110 (e.g., where an enterprise such as a business provides support for the assets it operates). In other embodiments, the IT assets 106 of the IT infrastructure 105 may be owned or operated by one or more enterprises different than the enterprise which operates the snapshot scheduling management system 110 (e.g., a first enterprise provides support for assets that are owned by multiple different customers, business, etc.). Various other examples are possible.

In some embodiments, the client devices 102 and/or the IT assets 106 of the IT infrastructure 105 may implement host agents that are configured for automated transmission of information regarding snapshot schedules or policies. Such host agents may also or alternatively be configured to automatically receive from the snapshot scheduling management system 110 commands or instructions to update or modify snapshot schedules or policies.

It should be noted that a "host agent" as this term is generally used herein may comprise an automated entity, such as a software entity running on a processing device. Accordingly, a host agent need not be a human entity.

The snapshot scheduling management system 110 in the FIG. 1 embodiment is assumed to be implemented using at least one processing device. Each such processing device generally comprises at least one processor and an associated memory, and implements one or more functional modules or logic for controlling certain features of the snapshot scheduling management system 110. In the FIG. 1 embodiment, the snapshot scheduling management system 110 implements IT asset state detection logic 112, reinforcement learning logic 114, and snapshot scheduling logic 116. The snapshot scheduling management system 110 is configured to detect requests for updated snapshot schedules for the IT assets 106 in the IT infrastructure 105. Responsive to detecting a request for an updated snapshot schedule for a given one of the IT assets 106, the IT asset state detection logic 112 is configured to determine a current state of the given IT asset (e.g., a set of snapshot parameters of a current snapshot schedule for the given IT asset and one or more performance metric values for the IT asset). The reinforcement learning logic 114 is configured to generate at least one updated parameter value for at least one snapshot parameter of the set of snapshot parameters to be utilized in the updated snapshot schedule for the given IT asset based at least in part on the current state of the IT asset. The snapshot scheduling logic 116 is configured to attach the updated snapshot schedule to the given IT asset. The snapshot scheduling management system 110 then monitors performance of the given IT asset utilizing the updated snapshot schedule. The reinforcement learning logic 114 is further configured to update its reinforcement learning framework based at least in part on a subsequent state of the given IT asset determined by the IT asset state detection logic 112 while the snapshot scheduling management system 110 is monitoring the performance of the given IT asset utilizing the updated snapshot schedule.

It is to be appreciated that the particular arrangement of the client devices 102, the IT infrastructure 105 and the snapshot scheduling management system 110 illustrated in the FIG. 1 embodiment is presented by way of example only, and alternative arrangements can be used in other embodiments. As discussed above, for example, the snapshot scheduling management system 110 (or portions of components thereof, such as one or more of the IT asset state detection logic 112, the reinforcement learning logic 114, and the snapshot scheduling logic 116) may in some embodiments be implemented internal to one or more of the client devices 102 and/or the IT infrastructure 105.

At least portions of the IT asset state detection logic 112, the reinforcement learning logic 114 and the snapshot scheduling logic 116 may be implemented at least in part in the form of software that is stored in memory and executed by a processor.

The snapshot scheduling management system 110 and other portions of the information processing system 100, as will be described in further detail below, may be part of cloud infrastructure.

The snapshot scheduling management system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the snapshot database 108 and the snapshot scheduling management system 110 or components thereof (e.g., the IT asset state detection logic 112, the reinforcement learning logic 114 and the snapshot scheduling logic 116) may be implemented on respective distinct processing platforms, although numerous other arrangements are possible. For example, in some embodiments at least portions of the snapshot scheduling management system 110 and one or more of the client devices 102, the IT infrastructure 105 and/or the snapshot database 108 are implemented on the same processing platform. A given client device (e.g., 102-1) can therefore be implemented at least in part within at least one processing platform that implements at least a portion of the snapshot scheduling management system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the snapshot database 108 and the snapshot scheduling management system 110, or portions or components thereof, to reside in different data centers. Numerous other distributed implementations are possible. The snapshot scheduling management system 110 can also be implemented in a distributed manner across multiple data centers.

Additional examples of processing platforms utilized to implement the snapshot scheduling management system 110 and other components of the information processing system 100 in illustrative embodiments will be described in more detail below in conjunction with FIGS. 11 and 12.

It is to be appreciated that these and other features of illustrative embodiments are presented by way of example only, and should not be construed as limiting in any way.

It is to be understood that the particular set of elements shown in FIG. 1 for generating parameter values for snapshot schedules utilizing a reinforcement learning framework is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for generating parameter values for snapshot schedules utilizing a reinforcement learning framework will now be described in more detail with reference to the flow diagram of FIG. 2. It is to be understood that this particular process is only an example, and that additional or alternative processes for generating parameter values for snapshot schedules utilizing a reinforcement learning framework may be used in other embodiments.

In this embodiment, the process includes steps 200 through 208. These steps are assumed to be performed by the snapshot scheduling management system 110 utilizing the IT asset state detection logic 112, the reinforcement learning logic 114 and the snapshot scheduling logic 116. The process begins with step 200, detecting a request for an updated snapshot schedule for an IT asset (e.g., one of the IT assets 106) in an IT infrastructure (e.g., IT infrastructure 105). The IT asset may comprise a VM.

In step 202, a current state of the IT asset is determined. The current state of the IT asset may comprise a set of snapshot parameters of a current snapshot schedule for the IT asset and one or more performance metric values for the IT asset. The set of snapshot parameters may comprise a frequency at which snapshots are taken and a retention time for the snapshots. The one or more performance metric values for the IT asset may comprise at least one of information characterizing input-output operations per second (IOPS), throughput, processor resource utilization, and latency. The current state of the IT asset may further comprise configuration information of the IT asset, the configuration information comprising at least one of an operating system (OS) running on the IT asset, processing resources of the IT asset, memory resources of the IT asset, and storage resources of the IT asset. The current state of the IT asset may further comprise information characterizing application types of one or more applications running on the IT asset. The current state of the IT asset may further comprise information characterizing input-output (IO) patterns of one or more applications running on the IT asset, the information characterizing IO patterns comprising information characterizing at least one of IO size of IO operations, a read-write ratio of the IO operations, and a ratio of sequential to random IO operations.

Figure 2:
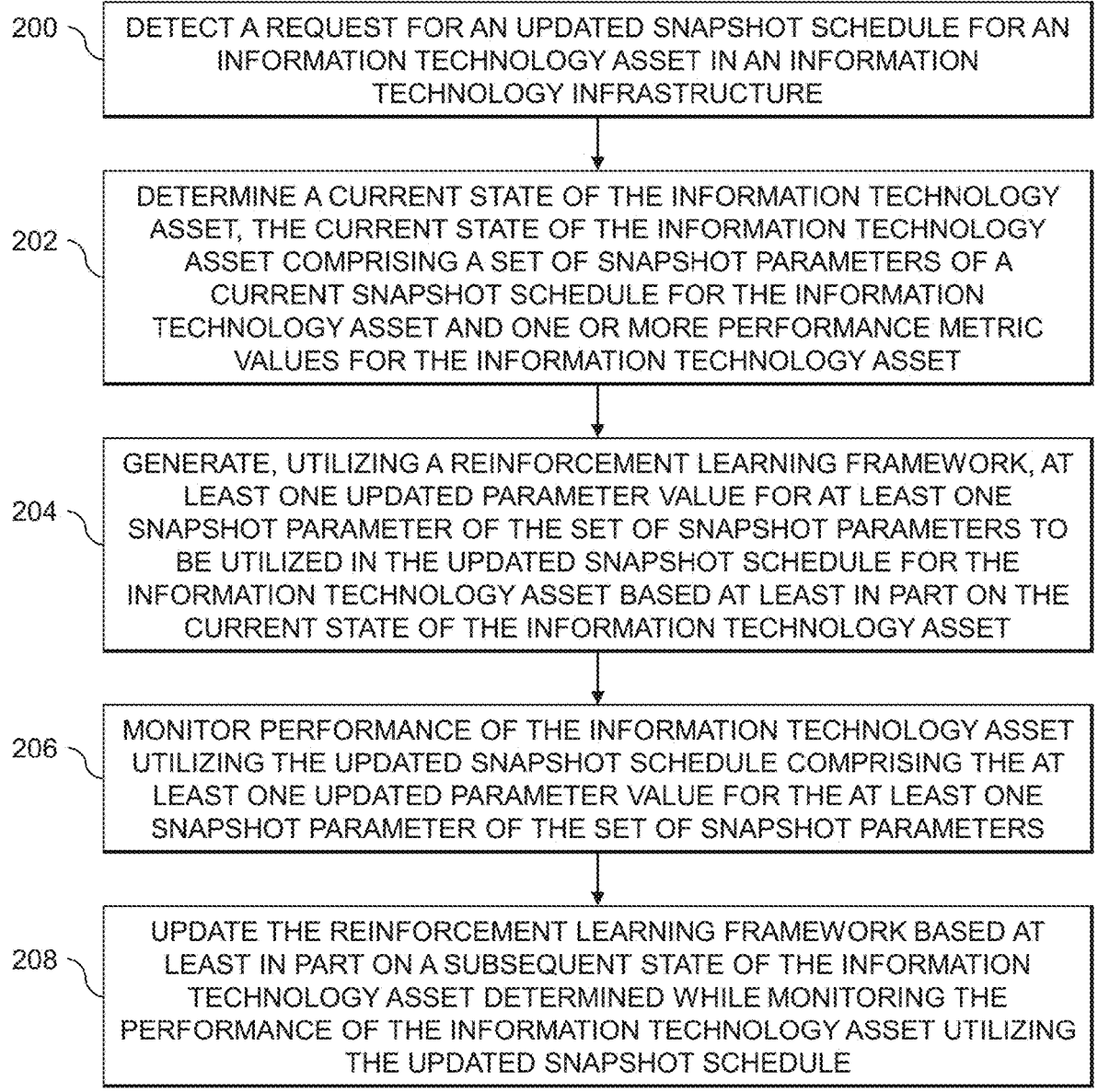
FIG. 2 is a flow diagram of an exemplary process for generating parameter values for snapshot schedules utilizing a reinforcement learning framework in an illustrative embodiment.

The FIG. 2 process continues in step 204 with generating, utilizing a reinforcement learning framework, at least one updated parameter value for at least one snapshot parameter of the set of snapshot parameters to be utilized in the updated snapshot schedule for the IT asset based at least in part on the current state of the IT asset determined in step 202. In step 206, performance of the IT asset is monitored while utilizing the updated snapshot schedule comprising the at least one updated parameter value for the at least one snapshot parameter of the set of snapshot parameters. The reinforcement learning framework is updated in step 208 based at least in part on a subsequent state of the IT asset determined while monitoring the performance of the IT asset utilizing the updated snapshot schedule.

In some embodiments, generating the at least one updated parameter value for the at least one snapshot parameter of the set of snapshot parameters in step 204 is further based at least in part on learned experience of the reinforcement learning framework, the learned experience comprising characterizations of whether different sets of one or more actions that modify parameter values for the set of snapshot parameters, taken from the current state of the IT asset, meet one or more designated goals for performance and data protection of the IT asset. The one or more designated goals may comprise meeting at least a threshold acceptable performance level while also meeting at least a threshold data protection level. The reinforcement learning framework may utilize a reward function which assigns a reward to the generated at least one updated parameter value for the at least one snapshot parameter of the set of snapshot parameters based at least in part on whether the subsequent state of the IT asset advances the one or more designated goals for performance and data protection of the IT asset. The request for the updated snapshot schedule for the IT asset may be detected in step 200 responsive to determining that a previous iteration of monitoring the performance of the IT asset did not meet the one or more designated goals for performance and data protection of the IT asset.

Step 202 may comprise determining whether the current state of the IT asset matches any of a plurality of state-action records of learned experience maintained by the reinforcement learning framework, each of the plurality of state-action records specifying a given value characterizing an extent to which taking a given set of one or more actions for modifying the at least one updated parameter value for the at least one snapshot parameter of the set of snapshot parameters meets one or more designated goals for performance and data protection of the IT asset. Responsive to determining that the current state of the IT asset does not match any of the plurality of state-action records, step 204 may include selecting a set of one or more actions for modifying the at least one updated parameter value for the at least one snapshot parameter of the set of snapshot parameters randomly from an action space, the action space defining permissible modifications to respective ones of the snapshot parameters in the set of snapshot parameters. Responsive to determining that the current state of the IT asset matches a given one of the plurality of state-action records, step 204 may include: selecting, with a first probability, a first set of one or more actions specified in the given one of the plurality of state-action records matching the current state of the IT asset; and selecting, with a second probability, a second set of one or more actions for modifying the at least one updated parameter value for the at least one snapshot parameter of the set of snapshot parameters randomly from an action space, the action space defining permissible modifications to respective ones of the snapshot parameters in the set of snapshot parameters.

Illustrative embodiments provide technical solutions for autonomous snapshot scheduling management (e.g., for VMs or other types of IT assets), based on a reinforcement learning framework that takes into account system performance impacts from applications, IO patterns and snapshot protection policies. In some embodiments, an end-to-end autonomous solution uses a machine learning approach which simulates the human brain to "learn" in a trial-and-error manner to find an optimal or improved snapshot schedule or policy for different IT assets (e.g., VMs). The machine learning approach in some embodiments utilizes a reinforcement learning framework that takes into account multiple applications or workloads which run on an IT asset (e.g., a VM), and determines a snapshot schedule or policy that provides an optimal or improved balance of different snapshot performance metrics (e.g., such as providing optimal or improved data protection while minimizing or reducing snapshot performance overhead). In this way, the technical solutions described herein can improve the overall performance of multiple applications while also improving data protection.

Various embodiments will be described below with respect to snapshot policies for VMs. It should be appreciated, however, that the technical solutions described herein may be applied for other types of IT assets and are not limited solely to use with managing snapshot scheduling or policies for VMs. VM snapshotting may be used to enforce service level agreements (SLAs) in VM environments such as VMware vSphere®. A snapshot preserves the state and data of a VM at a specific point in time. VM performance may be impacted by a snapshot schedule, application types (e.g., of one or more applications running on a VM), and IO patterns (e.g., of one or more applications running on the VM).

Figure 3A:
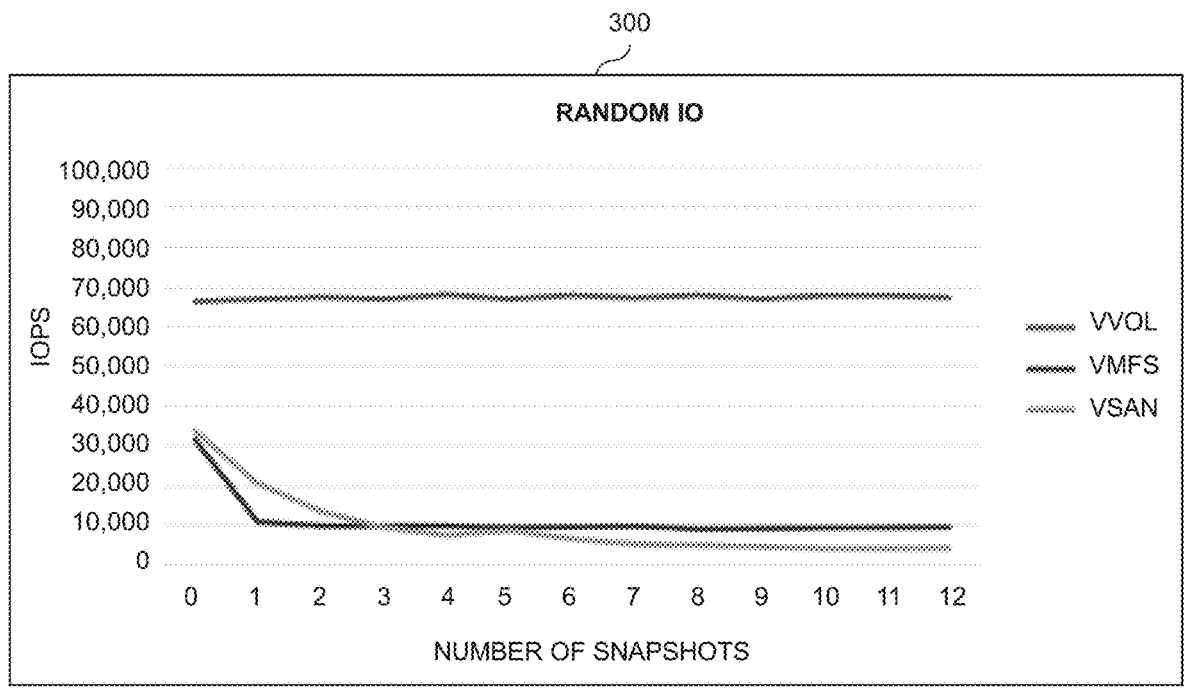
FIGS. 3A-3D show plots of snapshot performance for virtual machines under different benchmark workloads in an illustrative embodiment.
Figure 3B:
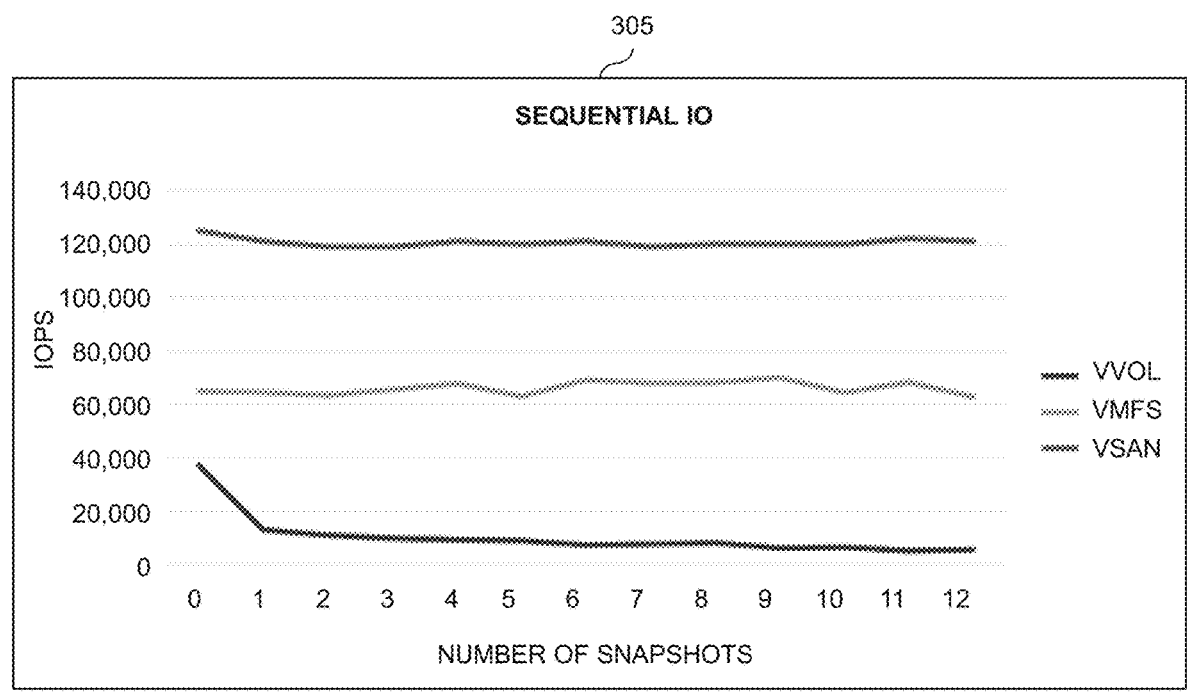
Figure 3C:
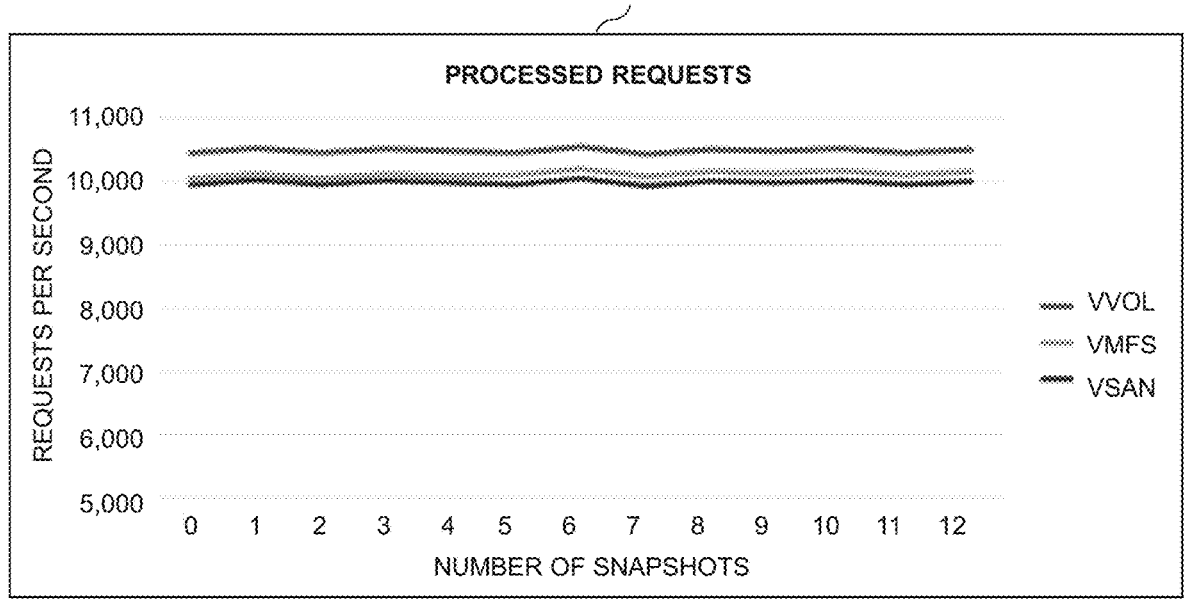
Figure 3D:
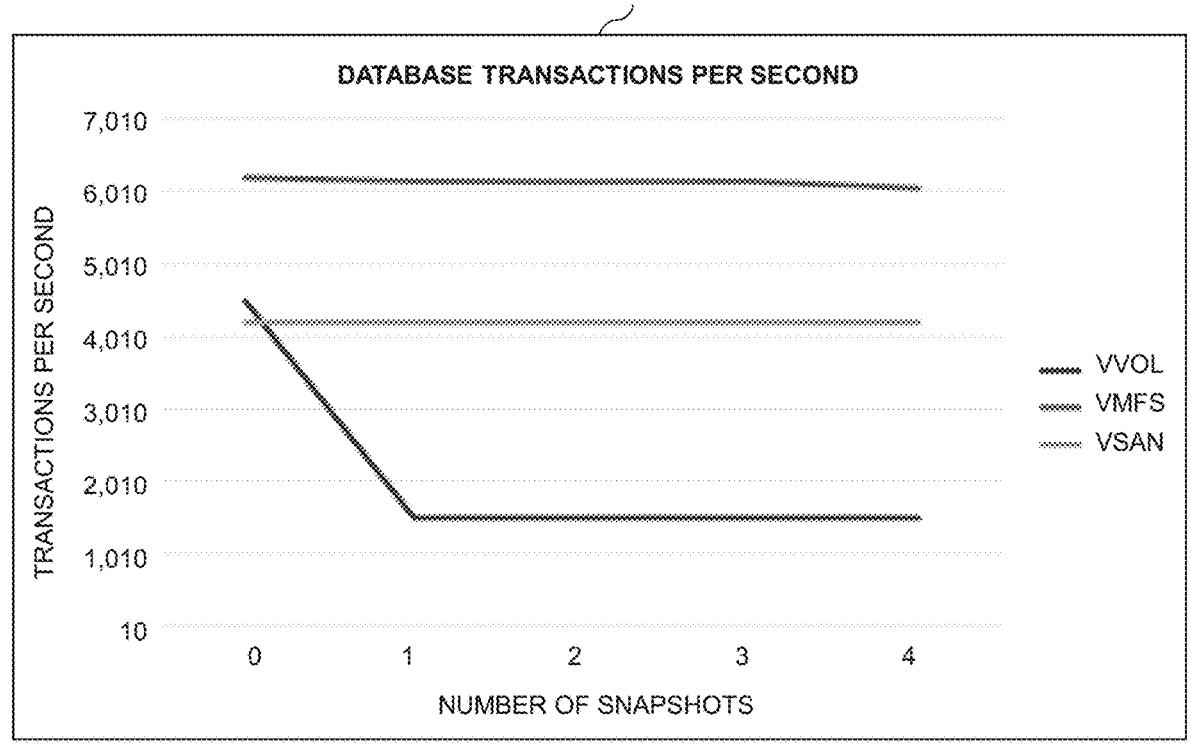

FIGS. 3A-3D show respective plots 300, 305, 310 and 315 showing the impact of VM snapshotting on the performance of guest applications running inside a VM using different benchmark workloads, where the performance of such workloads is evaluated for three different datastores-Virtual Machine File System (VMFS), Virtual Storage Area Network (vSAN) and Virtual Volume (vVOL). For each of the workload scenarios, VM performance without any snapshotting is used as a baseline. Testing is performed while varying the number of snapshots (e.g., from 1 to 12). With the addition of each new VM snapshot, the benchmarks are re-run to capture new performance numbers. FIG. 3A shows a plot 300 of input-output operations per second (IOPS) as a function of a number of snapshots with random IO operations. Here, a higher number of IOPS corresponds to better performance. FIG. 3B shows a plot 305 of IOPS as a function of a number of snapshots with sequential IO operations, where again a higher IOPS corresponds to better performance. Flexible Input-Output (FIO) benchmark testing may be used for obtaining the plots 300 and 305 of FIGS. 3A and 3B. FIG. 3C shows a plot 310 of processed requests per second as a function of a number of snapshots, which may be obtained using a Standard Performance Evaluation Corporation (SPEC) SPECjbb benchmark test, where the number of processed requests corresponds to jOPS (e.g., a measure of request injection rate), where a higher number of processed requests corresponds to better performance. FIG. 3D shows a plot 315 of database transactions per second as a function of a number of snapshots, where a higher number of transactions per second corresponds to better performance. In some embodiments, HammerDB benchmarking is utilized.

FIG. 4 shows a table 400 which summarizes guest application performance loss in the presence of one snapshot with a variety of workloads on the VMFS, vSAN and vVOL datastores. For each of the datastore scenarios, the performance loss is shown with one snapshot relative to the baseline performance without any snapshots on the respective datastore.

As can be seen from the plots 300, 305, 310 and 315 of FIGS. 3A-3D and the table 400 of FIG. 4, guest application performance suffers greatly with IO-based applications (e.g., FIO, HammerDB) in the presence of snapshots, with as much as 85% reduction in guest IOPS or database transactions per second when using a VMFS datastore. CPU and memory-heavy workloads (e.g., SPECjbb) with no disk IO components remain unaffected in the presence of snapshots. There is a minimal impact on guest performance when snapshots are created on a vVOL datastore. Although sequential IO-based workloads have minimal impact, random IO-based workloads suffer greatly in a vSAN environment in the presence of snapshots. Thus, it is concluded that a combination of factors may impact VM performance, including: snapshot schedule (e.g., where the snapshot schedule includes snapshot taken frequency and snapshot retention parameters, which may impact the snapshot number and further impact performance over time); application type (e.g., such as VMFS, vSAN and vVOL); and IO pattern (e.g., sequential IO, random IO, IO patterns with specific read/write ratios).

Conventional approaches for VM snapshot scheduling thus suffers from various technical problems. An approach which statically sets a snapshot schedule (e.g., the frequency at which snapshots are taken, the length of time that snapshots are retained) leads to inefficiencies, as such an approach does not leverage VM performance impact of the snapshot schedule, IO patterns and application types. If the snapshot schedule is not gracefully configured, a static snapshot schedule may impact performance or SLAs. For example, setting a more aggressive snapshot schedule may lead to more snapshots while some applications with specific IO patterns may have significant performance loss. Setting a less aggressive snapshot schedule, on the other hand, could lead to not protecting data well.

In one approach, customers or end-users are guided to set the frequency at which snapshots are taken along with the retention period for snapshots for different protection groups (e.g., a group of VMs or other IT assets). This may be done at different intervals, such as standard frequency snapshots (e.g., every hour, every 4 hours, every 6 hours, every 8 hours, every 12 hours, daily, weekly, monthly, etc.) or high frequency snapshots (e.g., every 30 minutes, every hour, every 2 hours, every 4 hours, every 8 hours, every 12 hours, daily, weekly, monthly, etc.). Similarly, snapshot retention duration may be set in terms of hours, days, weeks, months, years, etc.

Another technical problem is that setting an optimal or improved snapshot schedule for different applications and IO patterns to achieve a best or improved combination of protection and performance is heavily dependent on experience and manual effort.

Illustrative embodiments provide technical solutions which simulate the human brain to "learn" an optimal or improved snapshot schedule using a trial-and-error approach with multiple iterations to improve the performance of multiple applications (e.g., with different IO patterns and other workload characteristics) while best protecting data. The technical solutions described herein leverage the system performance impacts of different snapshot schedule, IO pattern and application type combinations. This provides improved performance relative to approaches which statically set a snapshot schedule. Advantageously, the technical solutions described herein do not rely on human experience and manual effort. The technical solutions instead provide an end-to-end autonomous solution for setting and updating snapshot schedules, which may continuously learn an optimal or improved snapshot schedule (e.g., using a reinforcement machine learning approach that simulates the human brain to "learn" in a trial-and-error fashion).

An example implementation of the end-to-end autonomous solution for determining snapshot schedules will now be described. Suppose that an application A1 is running on virtual machine VM1, and the goal is to find an optimal snapshot schedule S1 for VM1 that maximizes the following value:

$$\alpha * Performance\_Score + \beta * Data\_Protection\_Score$$

where α and β are used to weight performance and data protection parameters for snapshot schedules in order to best protect data while minimizing the impact of VM snapshot operations on application performance.

For different applications (e.g., having different IO patterns) on different VMs, conventional approaches force customers or end-users to rely on manual effort and experience to try several steps to determine an optimal snapshot schedule. This may be viewed as similar to playing video games, such as a virtual golf game which is a famous use case of reinforcement learning where the goal is to hit a golf ball from any starting position into the hole with as few swings as possible. Here, the environment is a golf course with complex terrain types (e.g., organized from least to most difficult as the green, fairway, rough, sand trap and water hazard), with actions (e.g., aiming a swing in any of the cardinal directions north, east, south or west or halfway between the cardinal directions northeast, southeast, northwest or southwest) and a goal (e.g., hitting the golf ball from the starting position into the hole with as few swings as possible, where the golf ball moves some designated amount per swing).

The technical solutions described herein implement a reinforcement learning framework which helps customers or end-users to determine an optimal or improved snapshot schedule for multiple applications with fewer trials. Reinforcement learning is a class of learning problems framed in the context of planning on a Markov Decision Process (MDP), in which agents train a model by interacting with the environment (e.g., a VM snapshot schedule) and where the agents receive rewards from the actions performed correctly (e.g., which meet one or more designated performance goals for snapshot scheduling) and penalties from the actions performed incorrectly (e.g., which do not meet or further the one or more designated performance goals for snapshot scheduling). After multiple trial-and-error training rounds, the autonomous snapshot scheduling management solution will know how to reach the target (e.g., the one or more designated performance goals for snapshot scheduling) without a person explicitly telling the autonomous snapshot scheduling management solution how to do so.

Figure 5:
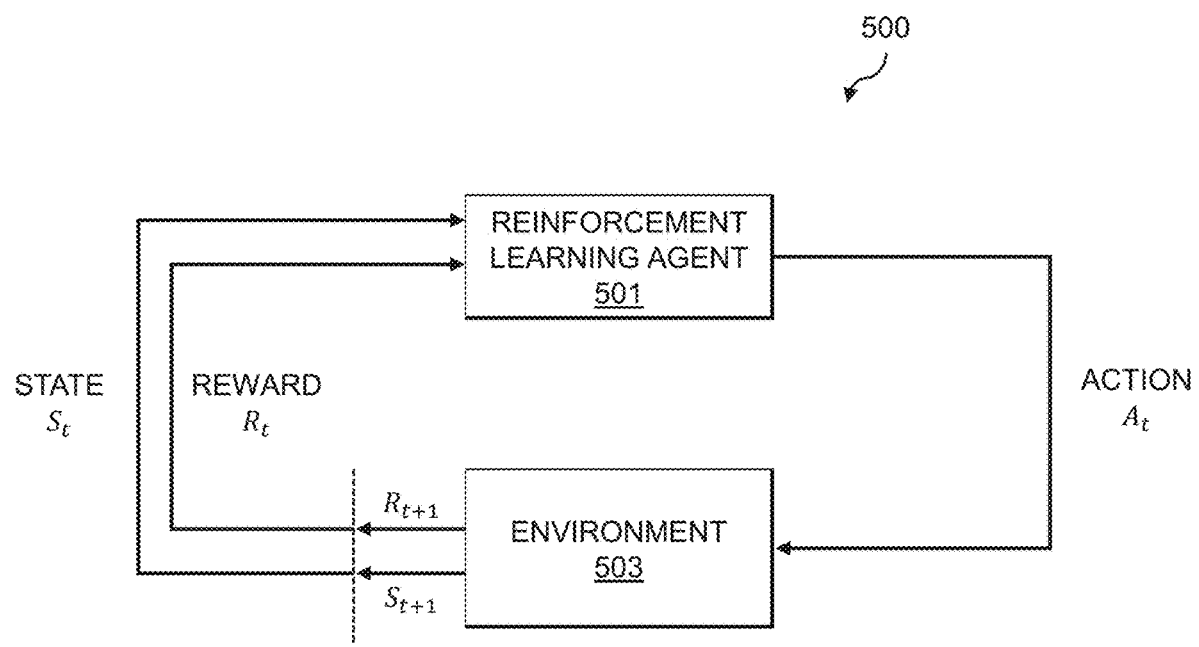
FIG. 5 shows a reinforcement learning framework for generating input-output patterns for storage system performance testing in an illustrative embodiment.

FIG. 5 illustrates a reinforcement learning framework 500, which includes a reinforcement learning agent 501 and an environment 503 (e.g., a VM or other IT asset to which a snapshot schedule is applied). As shown, the reinforcement learning agent 501 receives or observes a state St at a time t. The reinforcement learning agent 501 selects an action $A_t$ based on its action selection policy, and transitions to a next state $S_{t+1}$ at a time t+1. The reinforcement learning agent 501 receives a reward $R_{t+1}$ at a time t+1. The reinforcement learning agent 501 leverages a reinforcement learning algorithm, which may include but is not limited to a Q-learning algorithm, a Deep Q Networks (DQN) algorithm, a Double DQN (DDQN) algorithm, etc., to update an action-value function $Q(S_i, A_i)$. The action-value function defines a long-term value of taking an action $A_i$ in a state $S_i$, as will be described in further detail below. Over time, the reinforcement learning agent 501 learns to pursue actions that lead to the greatest cumulative reward at any state.

Techniques for defining states, actions and rewards will now be described. A state space S includes a set of possible state values. A state $S_t \in S$ is a vector of values from $S = \{S_1, S_2, \ldots, S_n\}$ at time step t. $S_t$ represents the schedule and runtime system status on a specific application at time step t:

$$S_t = \{VM_{info}, Snapshot\_Schedule_{info}, Application_{info}, IO\_pattern_{info}, runtime\_info_t\}$$

$VM_{info}$ is a static value representing information of the VM which may include, but is not limited to, guest operating system (OS) type, central processing unit (CPU) number, memory size, hard disk size, etc. $Snapshot\_Schedule_{info}$ includes the VM snapshot schedule information, such as the frequency at which snapshots are taken and the retention period for snapshots. $Application_{info}$ determines the format of the application, such as VMFS, vSAN, vVol, etc. $IO\_pattern_{info}$ represents the average IO pattern information during time step t, which includes but is not limited to IO size, read/write ratio, IO type (e.g., random, sequential, etc.). $runtime\_info_t$ represents an average runtime status (e.g., such as performance status) during time step t, such as the rounding value of average total throughput, average CPU utilization, average latency during the execution of a snapshot schedule on the VM, etc. FIG. 6 shows an example 600 of $S_t$.

The action space will now be described. The reinforcement learning agent 501, as noted above, observes the current state $S_t$ at each time step t and takes an action $A_t$. In some embodiments, the action $A_t$ involves modifying a single property of the snapshot schedule based on some specified snapshot scheduling performance parameter tuning policy. In some embodiments, the snapshot schedule includes two properties: the frequency at which snapshots are taken, denoted Snapshot_Taken_Frequency; and duration that snapshots are retained, denoted Snapshot_Retention. A snapshot schedule, denoted Snapshot_Schedule can thus be represented as:

{Snapshot_Taken_Frequency = 1 hour, Snapshot_Retention = 7 days}

The acceptable values for Snapshot_Taken_Frequency may be 30 minutes, 1 hour, 2 hours, 4 hours and 8 hours. The acceptable values for Snapshot_Retention may be 5 days, 6 days, 7 days, 8 days, 9 days and 10 days. The snapshot schedule in the above example means that a snapshot of the VM is taken once an hour, and that snapshots are kept for 7 days. The customer or end-user could accept changes to this schedule, ranging from snapshots being taken 30 minutes, 2 hours, 4 hours or 8 hours, and could accept snapshots being retained for 5 days, 6 days, 8 days, 9 days or 10 days. The shorter the Snapshot_Taken_Frequency and the longer the Snapshot_Retention means the VM will get more protection. The acceptable values for Snapshot_Taken_Frequency and Snapshot_Retention may be set by customers or end-users.

The action space may include actions such as: changing the Snapshot_Taken_Frequency within its acceptable value list, such as moving from a current value to the next smaller or the next bigger value; and changing the Snapshot_Retention within its acceptable value list, such as moving from a current value to the next smaller or the next bigger value. FIG. 7 shows a table 700, illustrating the action space with actions to change between current and new snapshot schedules for each iteration of a reinforcement learning framework.

The reward space will now be described. A reward function R is defined to guide the reinforcement learning agent 501 towards good solutions for a given objective (e.g., one or more designated performance goals for a snapshot schedule). The given objective, in some embodiments, is to find combinations of Snapshot_Taken_Frequency and Snapshot_Retention which have the most effective impact to snapshot schedule performance (e.g., best protecting data while minimizing the impact of VM snapshots on performance). The reward $R_{t+1}$ may thus be defined as:

$$R_{t+1} = \alpha * \text{Performance\_Score} + \beta * \text{Data\_Protection\_Score}$$

The Performance_Score may be defined as:

$$\text{Performance\_Score} = W1 * \left( \frac{-\text{Latency}_{average} + \text{Latency}_{initial}}{\text{Latency}_{initial}} \right) + W2 * \left( \frac{\text{throughput}_{average} - \text{throughput}_{initial}}{\text{throughput}_{initial}} \right)$$

The Data_Protection_Score may be defined as:

$$\text{Data\_Protection\_Score} = w1 * \frac{\text{maximum acceptable } Snaphot_{TakenFrequency}}{\text{Current } Snaphot_{TakenFrequency}} + w2 * \frac{\text{Current Snapshot\_Retention}}{\text{maximum acceptable Snaphot\_Retention}}$$

Suppose that the initial performance of the VM is with latency as $\text{Latency}_{initial}$ and throughput as $\text{throughput}_{initial}$. The reinforcement learning agent 501 changes the VM snapshot schedule and during time step t, $\text{Latency}_{average}$ is the average latency and $\text{throughput}_{average}$ is the average throughput. For the Performance_Score, the reward generated at time step t will be greater with less latency and more throughput being observed. For the Data_Protection_Score, the reward generated at time step t will be greater with shorter Snapshot_Taken_Frequency and longer the Snapshot_Retention. The value of the weights W1 and W2 will depend on the customer or end-user's focus on latency versus throughput for measuring performance, and $\Sigma_{i=1}^{N} Wi=1$, where Wi denotes the weight of factor i. Similarly, the value of the weights w1 and w2 will depend on the customer or end-user's focus on the frequency at which snapshots are taken versus the snapshot retention period, and $\Sigma_{i=1}^{N} wi=1$, where wi denotes the weight of the factor i. The values of $\alpha$ and $\beta$ will depend on the customer or end-user's focus on performance versus data protection, where $\alpha+\beta=1$. It should be noted that various other key performance indicators (KPIs) may be used to define the reward function in addition to or in place of throughput and latency, and that embodiments are not limited to the specific examples of throughput and latency.

Figure 8:
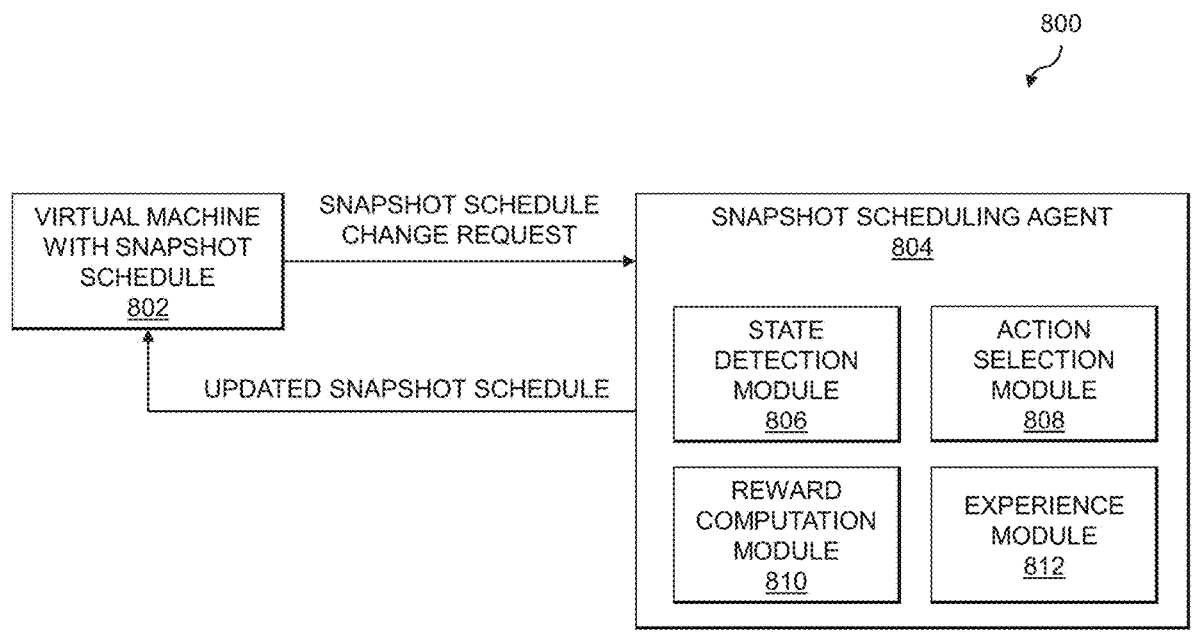
FIG. 8 shows a system for generating updated snapshot schedules for virtual machines utilizing reinforcement learning in an illustrative embodiment.

FIG. 8 shows a system 800 for a VM 802 having a snapshot schedule which obtains an updated (e.g., improved, optimized) snapshot schedule from a snapshot scheduling agent 804. The VM 802 may run on one of the IT assets 106 of the IT infrastructure 105, on one of the client devices 102 in the system 100 of FIG. 1. The snapshot scheduling agent 804 implements a number of functional modules which are utilized in implementing a learning-based autonomous snapshot scheduling agent that generates updated (e.g., improved, optimized) snapshot schedules for the VM 802. Such functional modules include a state detection module 806, an action selection module 808, a reward computation module 810 and an experience module 812. The snapshot scheduling agent 804 aims to find out an optimal or improved snapshot schedule for the VM 802, where the optimal or improved snapshot schedule provides the best data protection service for the applications running on the VM 802 while minimizing the snapshot performance overhead.

The state detection module 806 is configured to get the state $S_t$ of the VM 802, which may include static and runtime information including but not limited to a runtime performance matrix (e.g., IO latency, IOPS, CPU utilization, memory utilization, disk utilization, bandwidth utilization, etc.), runtime or static IO load pattern information (e.g., IO size, read/write ratio, load type), a current snapshot schedule (e.g., the frequency at which snapshots are taken, the snapshot retention time, etc.), etc. The action selection module 808 is configured to observe the current state $S_t$ of the VM 802 and determine a snapshot schedule changing action $A_t$. The reward computation module 810 is configured to calculate the reward of action $A_t$ in state $S_t$ based on the goal or objective (e.g., optimizing the snapshot schedule for VM 802 which provides a desired balance between data protection for applications running on the VM 802 while minimizing snapshot performance overhead). The experience module 812 is configured to utilize a reinforcement learning algorithm to update the experience Q(S, A) according to the current state $S_t$, action $A_t$, reward $R_t$ and next state $S_t+1$. The experience Q(S, A) is a mapping between the environment states and actions that maximizes a long term reward.

Figure 9:
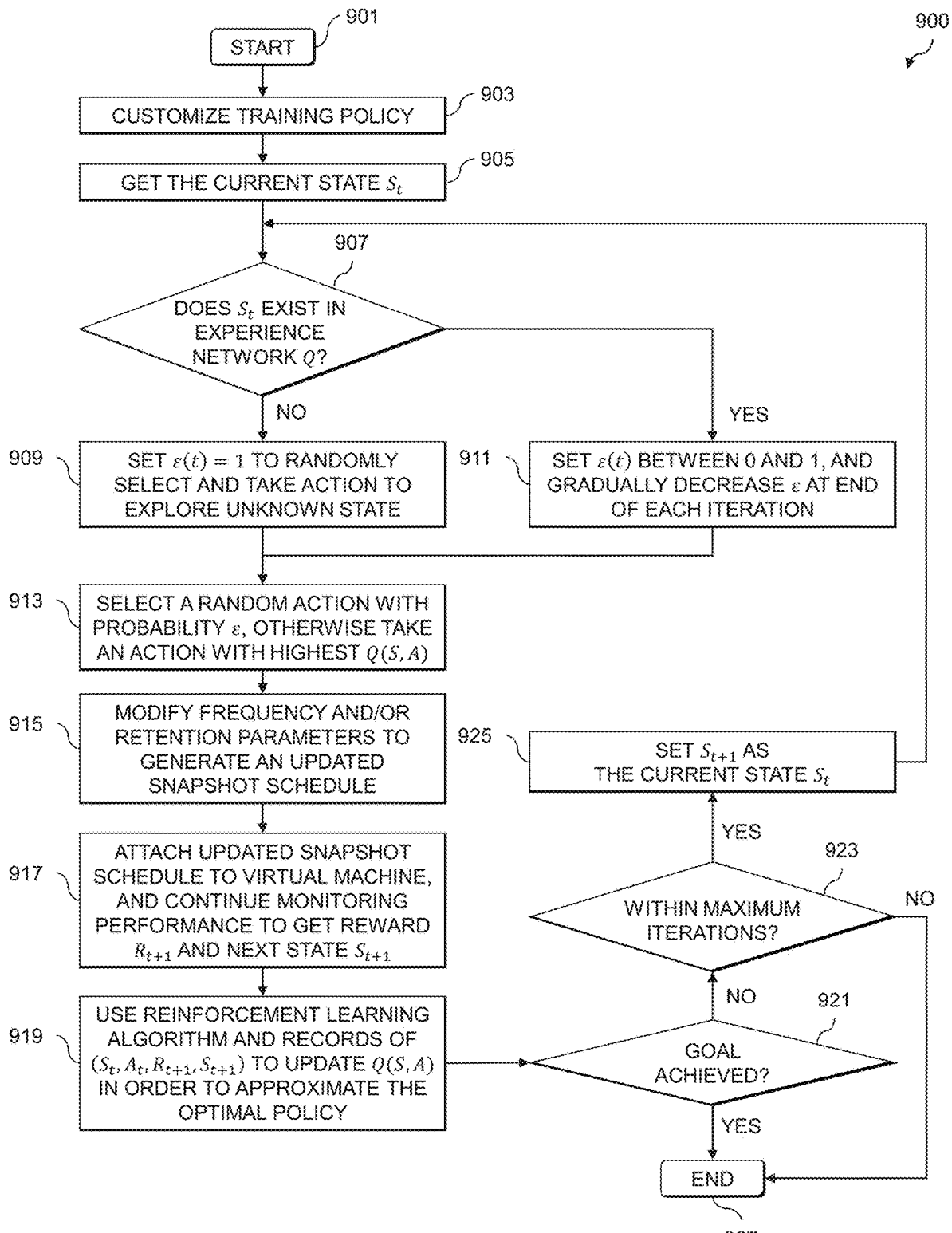
FIG. 9 shows a process flow for managing virtual machine snapshot schedules in an illustrative embodiment.

FIG. 9 shows a process flow 900 which may be performed by the snapshot scheduling agent 804. The process flow 900 starts in step 901, and a training policy for the reinforcement learning framework is customized in step 903. Customizing the training policy may include, for example, defining or updating the acceptable action space (e.g., acceptable values for Snapshot_Taken_Frequency and Snapshot_Retention), the maximum training attempts or iterations, an acceptable performance range (e.g., latency less than some designated threshold such as 5 milliseconds (ms)), etc. Customizing the training policy may also include defining or updating various weight values, such as $\alpha$, $\beta$, W1, W2, w1 and w2. In step 905, the snapshot scheduling agent 804 receives a snapshot schedule change request from the VM 802, and then the state detection module 806 gets the current state $S_t$ of the VM 802. The snapshot schedule change request may be triggered manually or automatically (e.g., responsive to determining that the VM 802 is having performance issues, responsive to expiration of some designated period of time since the snapshot schedule for the VM 802 was last updated, etc.). The current state $S_t$ may be defined with parameters such as $VM_{info}$, $Snapshot\_Schedule_{info}$, $Application_{info}$, $IO\_pattern_{info}$ and $runtime\_info_t$ as described above.

In step 907, a determination is made as to whether the current state $S_t$ exists in the experience network Q. If the result of the step 907 determination is no, the process flow 900 proceeds to step 909 where an exploration and exploitation tradeoff parameter ε for time step t, denoted ε(t), is set to 1 to randomly select and take an action to explore the unknown state. ε(t) is the possibility of taking a random action for exploration at time step t. If the result of the step 907 determination is yes, the process flow 900 proceeds to step 911 where ε(t) is set to a value between 0 and 1, with the value of ε being gradually decreased at the end of each attempt or iteration. In step 913, the action selection module 808 of the snapshot scheduling agent 804 selects with probability ε(t) a random action, otherwise (with probability 1−ε (t)) the action selection module 808 takes the best action (e.g., the action with the highest $Q(S_t, A_t)$ that has been observed thus far). When the result of the step 907 determination is yes, the action selection module 808 enters an "exploration and exploitation tradeoff" mode where the current state $S_t$ is a known state and the value of ε(t) is set between (0,1) and decreases over successive training attempts or iterations. As experience is gained through successive training attempts or iterations, the snapshot scheduling agent 804 thus tends to leverage the learned experience (e.g., exploitation). Before having enough experience, the snapshot scheduling agent 804 tends to take random actions (e.g., exploration). When the result of the step 907 determination is no, the action selection module 808 enters an "exploration" mode where the current state $S_t$ is an unknown state. The snapshot scheduling agent 804 adds the current state $S_t$ to the experience network Q, and sets ε(t)=1 which means that the action selection module 808 will 100% explore (e.g., take random action) when the current state $S_t$ is a new state.

In step 913, the action selection module 808 selects an action with probability ε, where ε is set in either step 909 or step 911 responsive to the step 907 determination. The snapshot scheduling agent 804 uses the selected action in step 915 to modify the snapshot schedule for the VM 802. Such action may include, for example, modifying the Snapshot_Taken_Frequency or the Snapshot_Retention parameter to generate the updated snapshot schedule. In step 917, the updated snapshot schedule is attached to the VM 802, and the performance of the VM 802 is monitored while the reward computation module 810 gets the reward $R_{t+1}$ and the state detection module 806 gets the next state $S_{t+1}$.

In step 919, the experience module 812 uses the reinforcement learning algorithm and records of ($S_t$, $A_t$, $R_{t+1}$, $S_{t+1}$) to update Q(S, A) in order to approximate the optimal snapshot schedule policy. Various reinforcement learning algorithms may be used to extrapolate the optimal snapshot schedule policy, including but not limited to Q-learning, Deep Q networks (DQN), and double DQN (DDQN). The experience Q(S, A) is an action-value mapping which represents the long-term value of action A at any state. Q(S, A) represents the possibility of hitting the goal of the snapshot scheduling agent 804 in the future (e.g., even if the snapshot scheduling agent 804 does not hit the goal immediately after taking the current action).

Figure 10:
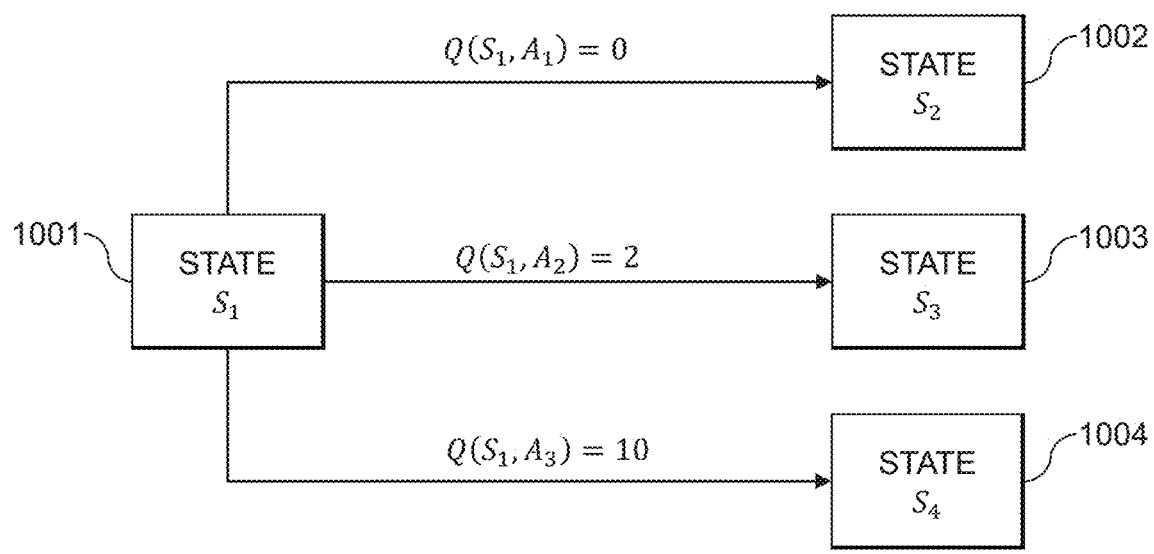
FIG. 10 shows action-value mapping for long-term values of actions in a reinforcement learning framework in an illustrative embodiment.

Long-term value is illustrated in FIG. 10, which shows various examples of actions that may be taken from a state $S_1$ 1001. At state $S_1$ 1001, after taking a first action $A_1$ a state $S_2$ 1002 is reached. From state $S_2$ 1002, there is no possibility of hitting the one or more designated goals such as making the VM 802 performance within the acceptable value (from the experience learned thus far). Thus, Q($S_1$, $A_1$)=0, which means the first action $A_1$ does not have long-term value. At state $S_1$ 1001, after taking a second action $A_2$ a state $S_3$ 1003 is reached. In state $S_3$ 1003 the one or more designated goals are not achieved, but upcoming actions starting from the state $S_3$ 1003 do eventually lead to achieving the one or more designated goals. Thus, the second action $A_2$ has value for the long term instead of the short term, and Q($S_1$, $A_2$)=2. At state $S_1$ 1001, after taking a third action $A_3$ the state $S_4$ 1004 is reached where the one or more designated testing goals are achieved immediately, and thus Q($S_1$, $A_3$)=10. The experience Q($S_i$, $A_i$) will get more and more accurate with every training iteration or episode. If enough training is performed, it will converge and represent the true Q-value.

Following step 919, a determination is made in step 921 as to whether the one or more designated goals are achieved. If the one or more designated goals are not achieved, the process flow 900 proceeds to step 923 where a determination is made as to whether a maximum number of iterations is reached (e.g., where the maximum number of iterations is set in step 903 when the training policy is customized). If the result of the step 923 determination is yes (e.g., that the maximum number of iterations is not yet reached), then the process flow proceeds to step 925 where the state $S_{t+1}$ is set as the current state $S_t$ and the process flow 900 returns to step 907. Steps 907 through 925 are then repeated as necessary, with the value of ε being gradually decreased as the end of each iteration and the experience Q being updated over time. The process flow 900 ends in step 927 when step 921 determines that the one or more designated goals are achieved, or when step 923 determines that the maximum number of iterations is reached. It should be noted that even in cases where the one or more designated goals (e.g., achieving VM 802 performance within a predefined acceptable value, such as a threshold latency and/or throughput metric), the learned experience Q of trying different actions will benefit decision-making by the snapshot scheduling agent 804 for the future.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating parameter values for snapshot schedules utilizing a reinforcement learning framework will now be described in greater detail with reference to FIGS. 11 and 12. Although described in the context of system 100, these platforms may also be used to implement at least portions of other information processing systems in other embodiments.

Figure 11:
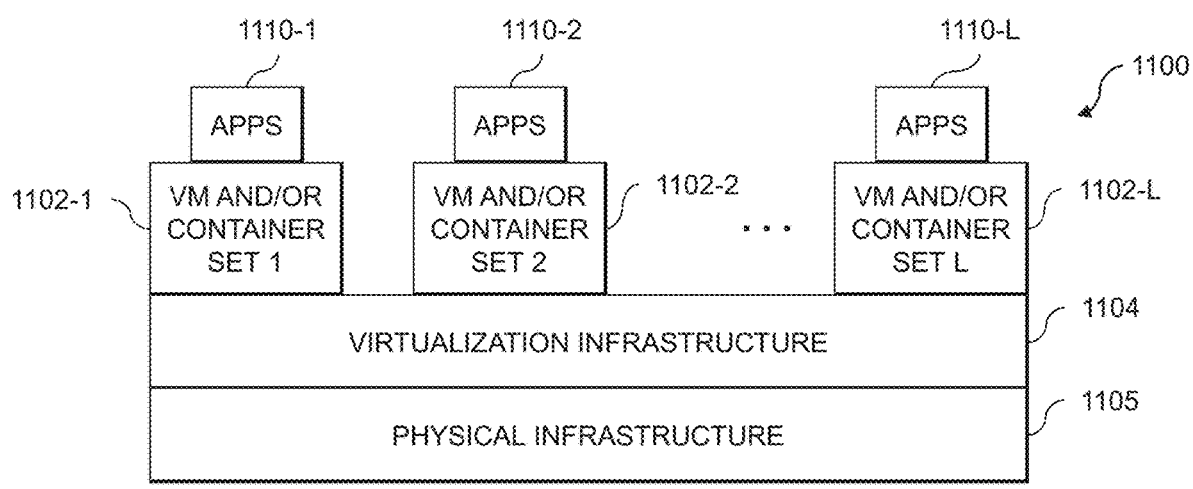
FIGS. 11 and 12 show examples of processing platforms that may be utilized to implement at least a portion of an information processing system in illustrative embodiments.
Figure 12:
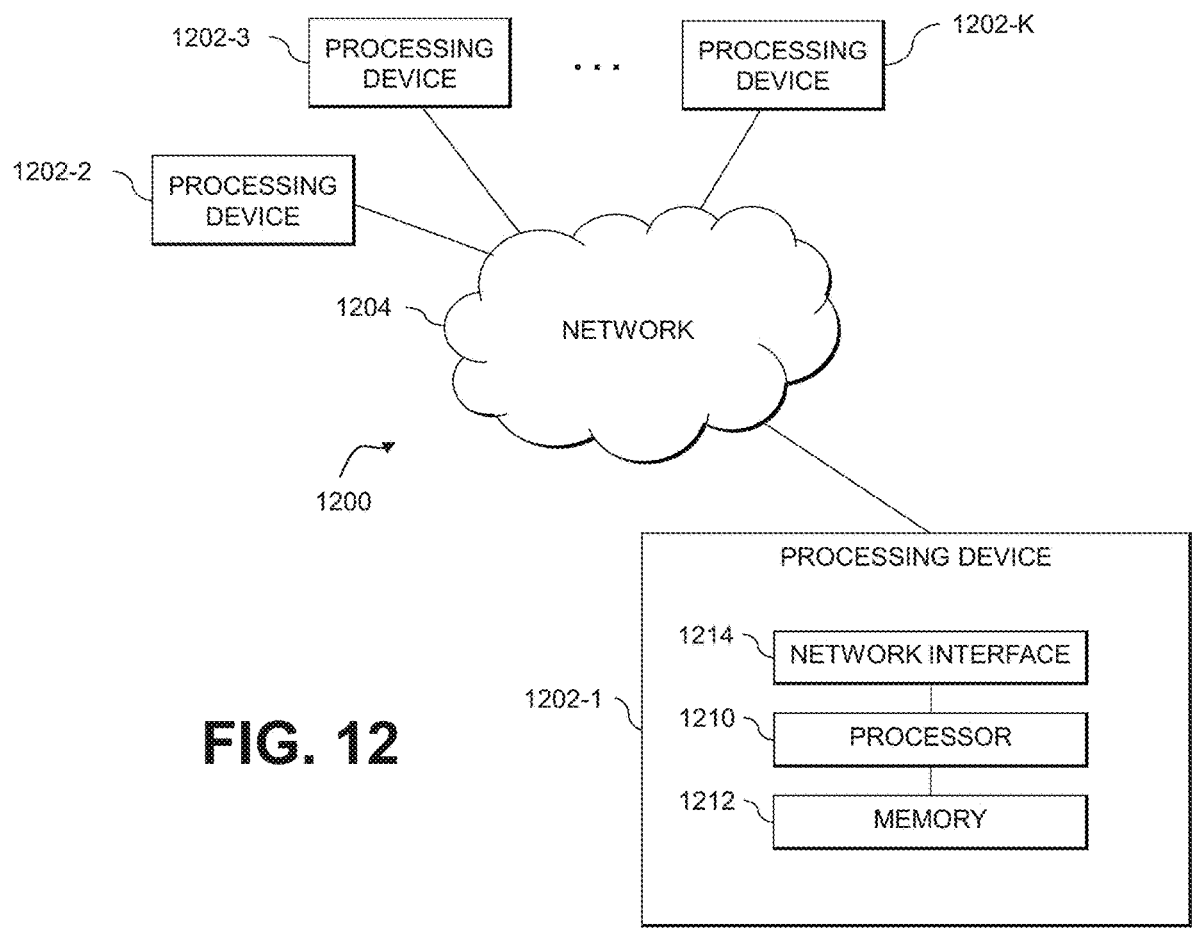

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. A, least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating parameter values for snapshot schedules utilizing a reinforcement learning framework as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, information technology assets, snapshot policies and tuning parameters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to detect a request for an updated snapshot schedule for an information technology asset in an information technology infrastructure;
        to determine a current state of the information technology asset, the current state of the information technology asset comprising a set of snapshot parameters of a current snapshot schedule for the information technology asset and one or more performance metric values for the information technology asset;
        to generate, utilizing a reinforcement learning framework and based at least in part on the current state of the information technology asset, at least one updated parameter value for at least one snapshot parameter of the set of snapshot parameters to be utilized in the updated snapshot schedule for adjusting a performance level of the information technology asset while maintaining at least a threshold data protection level, the at least one updated parameter value comprising at least one of a change in a frequency at which snapshots of the information technology asset are taken and a change in retention time for the snapshots of the information technology asset;
to monitor performance of the information technology asset utilizing the updated snapshot schedule comprising the at least one updated parameter value for the at least one snapshot parameter of the set of snapshot parameters; and
to update the reinforcement learning framework based at least in part on a subsequent state of the information technology asset determined while monitoring the performance of the information technology asset utilizing the updated snapshot schedule.

2. The apparatus of claim 1 wherein the information technology asset comprises a virtual machine.

3. The apparatus of claim 1 wherein the one or more performance metric values for the information technology asset comprise at least one of information characterizing input-output operations per second, throughput, processor resource utilization, and latency.

4. The apparatus of claim 1 wherein the current state of the information technology asset further comprises configuration information of the information technology asset, the configuration information comprising at least one of an operating system running on the information technology asset, processing resources of the information technology asset, memory resources of the information technology asset, and storage resources of the information technology asset.

5. The apparatus of claim 1 wherein the current state of the information technology asset further comprises information characterizing application types of one or more applications running on the information technology asset.

6. The apparatus of claim 1 wherein the current state of the information technology asset further comprises information characterizing input-output patterns of one or more applications running on the information technology asset, the information characterizing input-output patterns comprising information characterizing at least one of input-output size of input-output operations, a read-write ratio of the input-output operations, and a ratio of sequential to random input-output operations.

7. The apparatus of claim 1 wherein the at least one updated parameter value comprises:
the change in the frequency at which snapshots of the information technology asset are taken; and
the change in the retention time for the snapshots of the information technology asset.

8. The apparatus of claim 1 wherein generating the at least one updated parameter value for the at least one snapshot parameter of the set of snapshot parameters is further based at least in part on learned experience of the reinforcement learning framework, the learned experience comprising characterizations of whether different sets of one or more actions that modify parameter values for the set of snapshot parameters, taken from the current state of the information technology asset, meet one or more designated goals for performance and data protection of the information technology asset.

9. The apparatus of claim 8 wherein the one or more designated goals comprises meeting at least a threshold acceptable performance level while also meeting at least the threshold data protection level.

10. The apparatus of claim 8 wherein the reinforcement learning framework utilizes a reward function which assigns a reward to the generated at least one updated parameter value for the at least one snapshot parameter of the set of snapshot parameters based at least in part on whether the subsequent state of the information technology asset advances the one or more designated goals for performance and data protection of the information technology asset.

11. The apparatus of claim 8 wherein the request for the updated snapshot schedule for the information technology asset is detected responsive to determining that a previous iteration of monitoring the performance of the information technology asset did not meet the one or more designated goals for performance and data protection of the information technology asset.

12. The apparatus of claim 1 wherein generating the at least one updated parameter value for the at least one snapshot parameter of the set of snapshot parameters comprises determining whether the current state of the information technology asset matches any of a plurality of state-action records of learned experience maintained by the reinforcement learning framework, each of the plurality of state-action records specifying a given value characterizing an extent to which taking a given set of one or more actions for modifying the at least one updated parameter value for the at least one snapshot parameter of the set of snapshot parameters meets one or more designated goals for performance and data protection of the information technology asset.

13. The apparatus of claim 12 wherein, responsive to determining that the current state of the information technology asset does not match any of the plurality of state-action records, selecting a set of one or more actions for modifying the at least one updated parameter value for the at least one snapshot parameter of the set of snapshot parameters randomly from an action space, the action space defining permissible modifications to respective ones of the snapshot parameters in the set of snapshot parameters.

14. The apparatus of claim 12 wherein, responsive to determining that the current state of the information technology asset matches a given one of the plurality of state-action records:
selecting, with a first probability, a first set of one or more actions specified in the given one of the plurality of state-action records matching the current state of the information technology asset; and
selecting, with a second probability, a second set of one or more actions for modifying the at least one updated parameter value for the at least one snapshot parameter of the set of snapshot parameters randomly from an action space, the action space defining permissible modifications to respective ones of the snapshot parameters in the set of snapshot parameters.

15. A computer program product comprising a non-transitory processor-readable storage medium having stored therein program code of one or more software programs, wherein the program code when executed by at least one processing device causes the at least one processing device:
to detect a request for an updated snapshot schedule for an information technology asset in an information technology infrastructure;
to determine a current state of the information technology asset, the current state of the information technology asset comprising a set of snapshot parameters of a current snapshot schedule for the information technology asset and one or more performance metric values for the information technology asset;
to generate, utilizing a reinforcement learning framework and based at least in part on the current state of the information technology asset, at least one updated parameter value for at least one snapshot parameter of the set of snapshot parameters to be utilized in the updated snapshot schedule for adjusting a performance level of the information technology asset while maintaining at least a threshold data protection level, the at least one updated parameter value comprising at least one of a change in a frequency at which snapshots of the information technology asset are taken and a change in retention time for the snapshots of the information technology asset;

to monitor performance of the information technology asset utilizing the updated snapshot schedule comprising the at least one updated parameter value for the at least one snapshot parameter of the set of snapshot parameters; and to update the reinforcement learning framework based at least in part on a subsequent state of the information technology asset determined while monitoring the performance of the information technology asset utilizing the updated snapshot schedule.

16. The computer program product of claim 15 wherein the information technology asset comprises a virtual machine.

17. The computer program product of claim 15 wherein the at least one updated parameter value comprises:
the change in the frequency at which snapshots of the information technology asset are taken; and
the change in the retention time for the snapshots of the information technology asset.

18. A method comprising:
detecting a request for an updated snapshot schedule for an information technology asset in an information technology infrastructure;
determining a current state of the information technology asset, the current state of the information technology asset comprising a set of snapshot parameters of a current snapshot schedule for the information technology asset and one or more performance metric values for the information technology asset;
generating, utilizing a reinforcement learning framework and based at least in part on the current state of the information technology asset, at least one updated parameter value for at least one snapshot parameter of the set of snapshot parameters to be utilized in the updated snapshot schedule for adjusting a performance level of the information technology asset while maintaining at least a threshold data protection level, the at least one updated parameter value comprising at least one of a change in a frequency at which snapshots of the information technology asset are taken and a change in retention time for the snapshots of the information technology asset;
monitoring performance of the information technology asset utilizing the updated snapshot schedule comprising the at least one updated parameter value for the at least one snapshot parameter of the set of snapshot parameters; and
updating the reinforcement learning framework based at least in part on a subsequent state of the information technology asset determined while monitoring the performance of the information technology asset utilizing the updated snapshot schedule;
wherein the method is performed by at least one processing device comprising a processor coupled to a memory.

19. The method of claim 18 wherein the information technology asset comprises a virtual machine.

20. The method of claim 18 wherein the at least one updated parameter value comprises:
the change in the frequency at which snapshots of the information technology asset are taken; and
the change in the retention time for the snapshots of the information technology asset.

* * * * *